United States Patent [19]

Lanava

[11] Patent Number: 5,211,434
[45] Date of Patent: May 18, 1993

[54] SLIDABLE UTILITY CARRIER

[76] Inventor: Santo M. Lanava, 118 Blithewood Ave., Worcester, Mass. 01604

[21] Appl. No.: 833,457

[22] Filed: Feb. 7, 1992

[51] Int. Cl.[5] .............................. B62B 15/00
[52] U.S. Cl. .......................... 294/1.1; 280/19
[58] Field of Search .................. 294/1.1; 280/19, 19.1, 280/20; 220/7; 229/198.1; 15/257.1, 257.6

[56] References Cited

U.S. PATENT DOCUMENTS

| | | |
|---|---|---|
| 2,517,178 | 8/1950 | Cheatham, Jr. |
| 2,608,842 | 9/1952 | Greene et al. ............ 294/144 |
| 2,615,724 | 10/1952 | Lee . |
| 2,841,306 | 7/1958 | Vitoux ..................... 220/7 |
| 3,017,194 | 1/1962 | Anderson . |
| 3,469,762 | 9/1969 | Torre .................. 15/257.6 X |
| 3,476,303 | 11/1969 | Smith ................ 229/198.1 X |
| 3,938,819 | 2/1976 | Martin ..................... 280/19 |
| 4,173,351 | 11/1979 | Hetland .............. 294/1.1 X |
| 4,449,662 | 5/1984 | Okamura et al. ....... 229/198.1 X |
| 4,471,600 | 9/1984 | Dunleavy . |
| 4,693,504 | 9/1987 | Baker . |
| 4,720,013 | 1/1988 | Nichols et al. ......... 229/915 X |
| 4,738,477 | 4/1988 | Grossmeyer . |
| 4,796,938 | 1/1989 | Knights . |
| 4,955,925 | 9/1990 | Platti ................. 15/257.1 X |

FOREIGN PATENT DOCUMENTS 685799  3/1965  Italy ........................... 220/7

Primary Examiner—David M. Mitchell
Assistant Examiner—Dean J. Kramer
Attorney, Agent, or Firm—Fish & Richardson

[57] ABSTRACT

A slidable utility carrier which has a rectangular bottom panel and four rectangular side panels which form a rectangular box-like structure having an open top. Each side panel is hinged to the bottom panel and is secured to the adjacent side panel by removable fasteners. The carrier can be collapsed to a fully opened state in which all of the panels lay in the same plane and extend outwardly from the bottom panel for collecting loose particulate material or to a compact state in which the side panels overlie the bottom panel to form a compact package for storing.

4 Claims, 3 Drawing Sheets

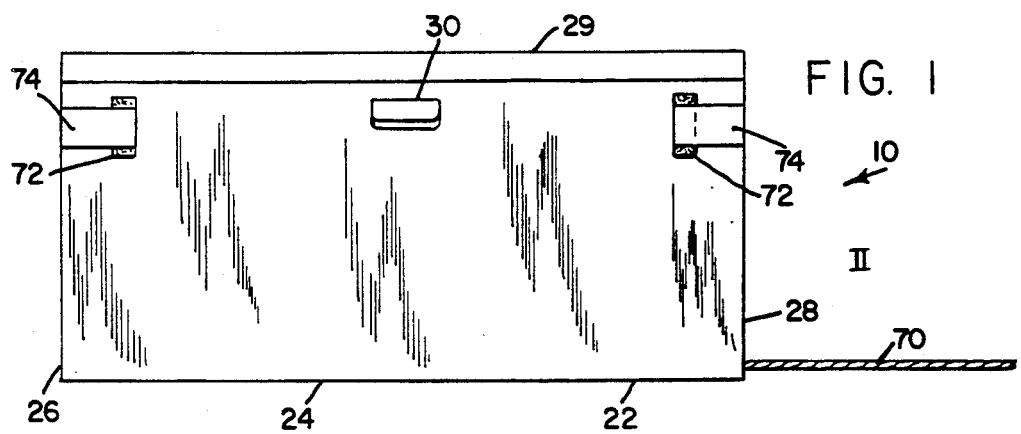
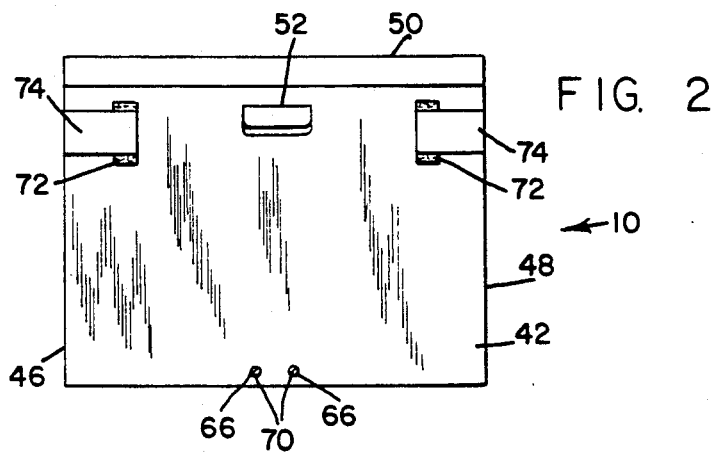
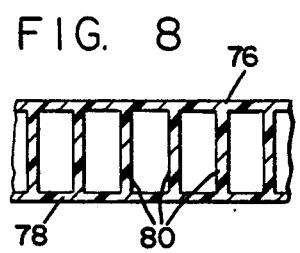
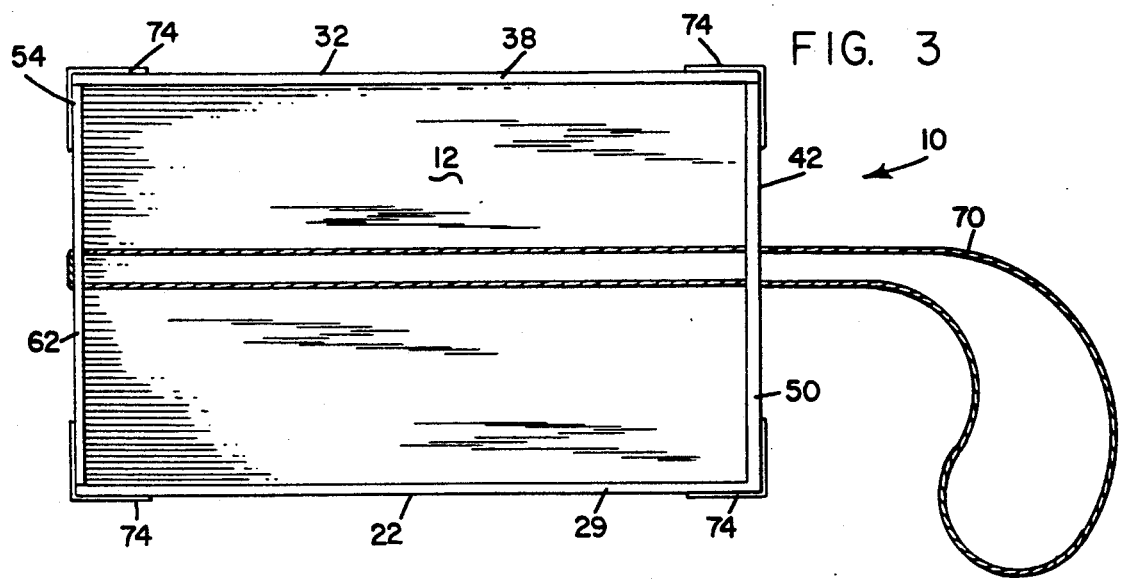

SLIDABLE UTILITY CARRIER

BACKGROUND OF THE INVENTION

The present invention relates generally to a utility carrier and particularly to a wheelless foldable carrier for collecting and transporting loose particulate materials, including leaves or other garden and lawn debris and also for collecting and transporting snow.

Many types of carts have been developed for use in performing yard and garden chores. The traditional wheelbarrow is one of the most versatile tools for collecting and transporting loose particulate material in industrial and domestic applications. However, the wheelbarrow has limitations when dealing with lightweight voluminous loose materials such as leaves and garden clippings. In addition, the wheelbarrow is a relatively bulky and difficult item to store. Oversized garden carts have been introduced in recent years for carrying light bulky material. The oversized cart does not make it any easier to pick up the light bulky material and it is even more difficult to store than the wheelbarrow. Many gardeners resort to the use of canvas cloth for picking up loose materials such as leaves and garden clippings. Leaves can be raked onto the cloth and the corners of the cloth drawn together and tied. This solves the problem of picking up the material to an acceptable degree, but the cloth is not very effective for transporting the material. The leave-filled cloth is difficult to drag and awkward to carry, usually requiring two people to carry the filled cloth. These and other difficulties experienced with these prior art carriers for lawn and garden material have been obviated by the present invention.

It is, therefore, a principal object of the invention to provide a wheelless utility carrier for loose particulate material which is easy to fill, convenient for transporting and requires very little storage space.

Another object of this invention is the provision of a wheelless utility carrier which converts easily between a collapsed state for filling and storing and an assembled state for transporting.

A further object of the present invention is the provision of a wheelless utility carrier for loose particulate material which has no moving parts.

It is another object of the present invention to provide a wheelless utility carrier which is made of lightweight, waterproof, durable material and slides very easily over most types of terrain.

A still further object of the invention is the provision of a wheeled utility carrier which is simple in construction, which is inexpensive to manufacture, and which is capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

In general, the invention consists of a slidable utility carrier having a rectangular bottom panel and four rectangular side panels which form a rectangular box-like structure having an open top. Each side panel is hinged to the bottom panel and is secured to adjacent side panels by removable fastening means. The carrier can be collapsed to a fully opened state in which all of the panels lay in the same plane and extend outwardly from the bottom panel for collecting loose particulate material or to a compact state in which the side panels overlie the bottom panel to form a compact package for storing.

BRIEF DESCRIPTION OF THE DRAWINGS

The character of the invention, however, may be best understood by reference to one of its structural forms, as illustrated by the accompanying drawings, in which:

FIG. 1 is a side elevational view of the utility carrier in the assembled state embodying the principals of the present invention, FIG. 2 is an end elevational view of the carrier, FIG. 3 is a top plan view of the carrier, FIG. 8 is a fragmentary cross-sectional view of the material from which the carrier is constructed.

DETAILED DESCRIPTION OF THE INVENTION

Figure 4:
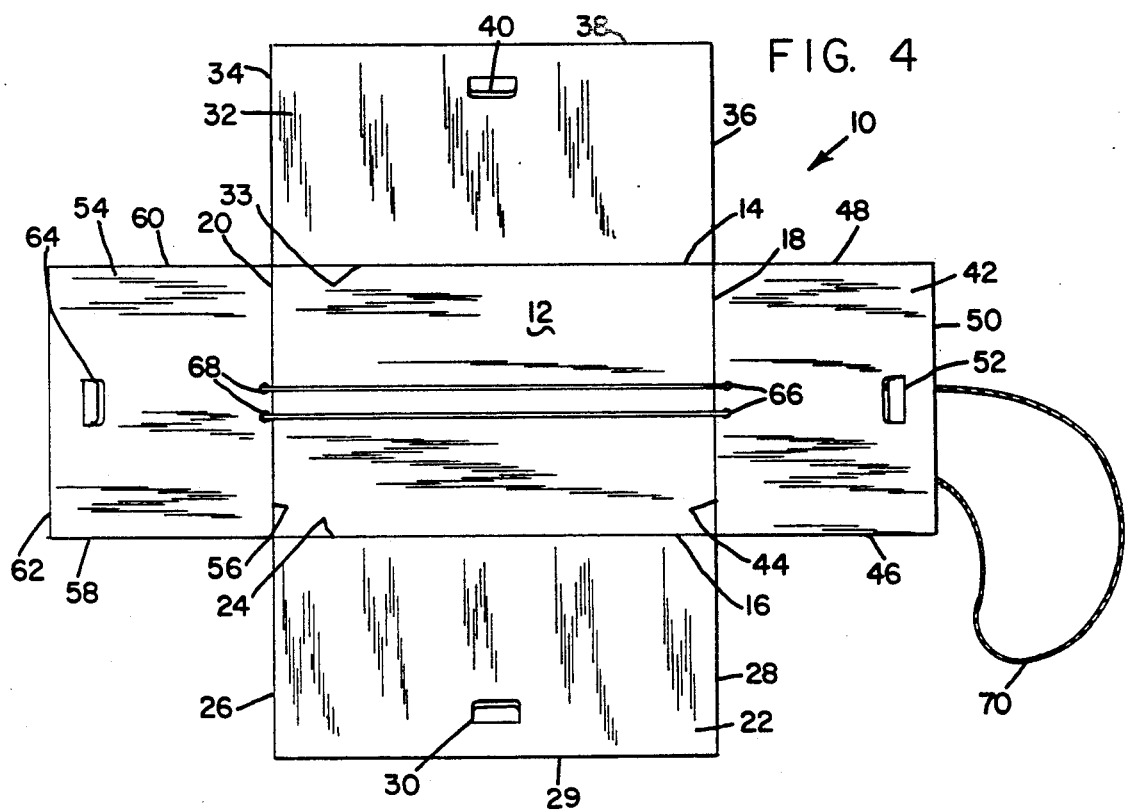
FIG. 4 is a plan view of the carrier in the collapsed, open state.

Referring to the drawings, the utility carrier of the present invention is generally indicated by the reference numeral 10 and comprises a rectangular bottom panel 12, rectangular first and second side panels 22 and 32, respectively, and opposite rectangular first and second end panels 42 and 54, respectively. The bottom panel 12 has a pair of opposite side edges 14 and 16 and a pair of opposite end edges 18 and 20. The first side panel 22 has a bottom edge 24 which is hinged to the bottom panel 12 along the side edge 16. The first side panel 22 has a pair of opposite end edges 26 and 28 and a top edge 29. A cut out 30 in the panel 22 provides a handhold for carrying the carrier when it is in the collapsed, folded state as shown in FIG. 5. The second side panel 32 has a bottom edge 33 which is hinged to the bottom panel 12 along the edge 14 of the bottom panel. The second side panel 32 has a pair of side edges 34 and 36 and a top edge 38. A cut out 40 is located in the panel 32 to provide a handhold for carrying the carrier when it is in the collapsed, folded state. The first end panel 42 has a bottom edge 44 which is hingedly attached to the bottom edge 18 of the bottom panel. The first side panel 42 has a pair of end edges 46 and 48 and a top edge 50. A cut out 52 is located in the first end panel 42 to provide a handhold. The second end panel 54 has a bottom edge 56 which is hingedly connected to the end edge 20 of the bottom panel 12. The carrier 10 is formed from a single piece of extruded corrugated polypropylene. The cross-sectional structure of the sheet of polypropylene is shown in FIG. 8 and comprises a first planar layer 76, a second planar layer 78 and a plurality of transverse connecting webs 80. The corners of the single sheet are cut out to form the side and end panels as shown in FIG. 4 and the side and end panels are bent along the respective bottom edges to form so-called "living hinges" with the bottom panel 12.

The end panel 42 has a pair of apertures 66 adjacent the bottom edge 44. The end panel 54 has a pair of apertures 68 adjacent the bottom edge 56. A cord 70 extends through the apertures 66 and 68 over the top surface of the bottom panel 12 and functions as a pulling handle to use in a manner to be described.

Figure 5:
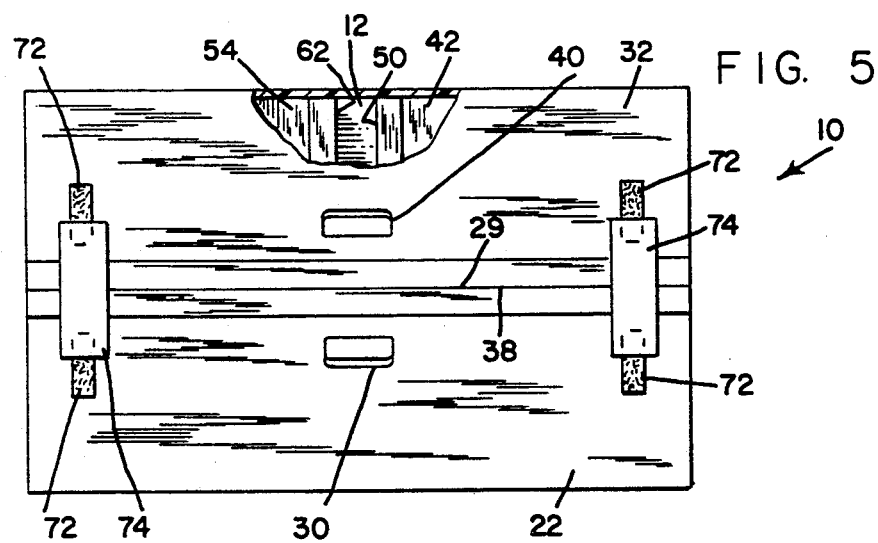
FIG. 5 is a plan view of the carrier in the collapsed, folded state.

The carrier 10 is shown in an open, collapsed state in FIG. 4 and in a closed, collapsed state in FIG. 5. The carrier 10 is converted to its assembled state as shown in FIGS. 1-3 by pivoting the side panels 22 and 32 along the edges 16 and 14, respectively, toward each other to a vertical position and by pivoting the end panels 42 and 54 along the edges 18 and 20, respectively, toward each other to a vertical position. When the carrier is in the assembled state the side edges 46 and 48 of the end panel 42 abut the side edges 28 and 36, respectively, of the side panels 22 and 32, respectively. The side edges 58 and 60 of the end panel abut the side edges 26 and 32, respectively, of the side panels 22 and 32, respectively. Each of the side and end panels have a strip of fibrous pile material adjacent each upper corner of the panel. A removable strip of complementary fastening material 74 extends from each strip 72 of an end panel to an adjacent strip 72 of the abutting side panel for maintaining the panels in the upright position shown in FIGS. 1-3 so that the panels collectively form a box-like structure which is shown most clearly in FIG. 7. The complementary fastening material 74 is a flexible fabric having a foundation structure and a plurality of raised-pile threads in the form of material engaging hooks of the type shown and described in U.S. Pat. No. 2,717,437. It is contemplated that other types of fastening means could be used which employ male and female snap components. Preferably, the top edge of each panel is folded over to form a hem which helps to reinforce and stiffen the panel and to prevent the top edge of each panel from being an open structure which would have a tendency to collect dust and moisture. The hems are secured to the side and end panels by use of adhesive or ultrasonic bonding.

Figure 7:
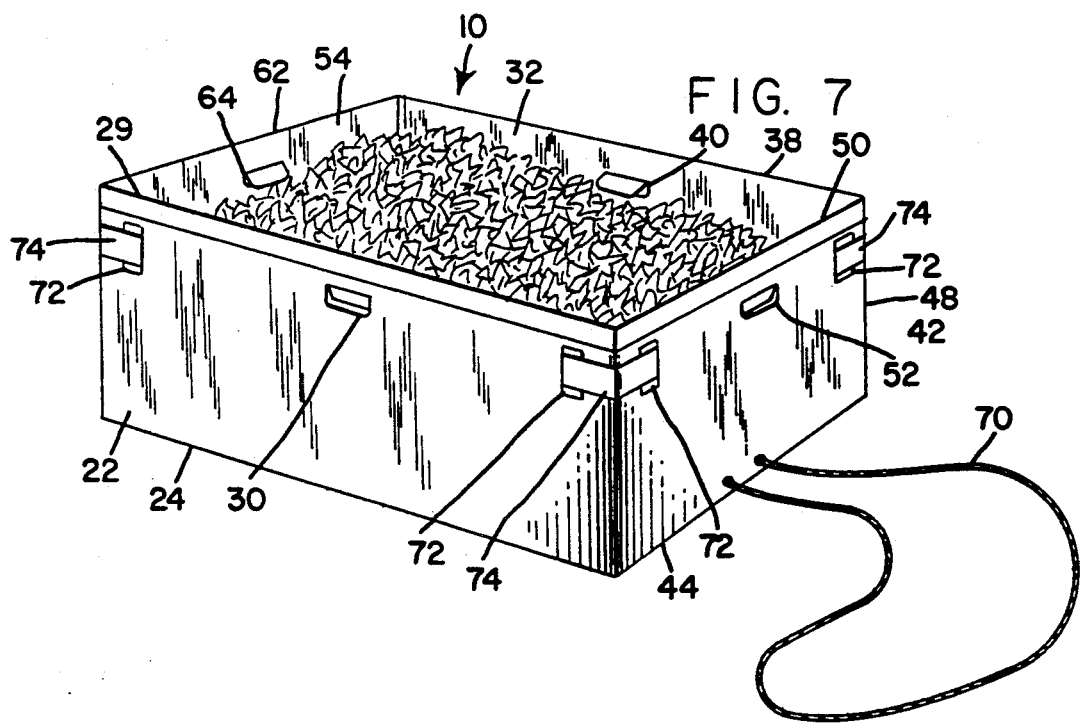
FIG. 7 is a perspective view of the carrier in the assembled state for transporting loose particulate material.

When the carrier 10 is not being used, it is converted to its collapsed, folded state by pivoting the end panels 42 and 54 toward each other so that they overlie the bottom panel 12. The side panels 22 and 32 are then pivoted toward each other so that they overlie the end panels 42 and 54 as shown in FIG. 5. The carrier 10 is maintained in this flat, compact state by extending a fastening component 74 from each complementary fastening element 72 of one side panel across the abutting edges 29 and 38 of the side panels to the adjacent complementary fastening elements 72 of the other side panel as shown in FIG. 5. In this way, the fastening elements 72 and 74 serve a dual purpose for maintaining the carrier in its expanded, utilitarian state as shown in FIG. 7 and in its collapsed, folded state for storage as shown in FIG. 5.

The carrier 10 can be utilized for collecting and transporting loose particulate material by converting it to its assembled state as shown in FIGS. 1-3 and 7. The carrier is filled with material and then moved from the collection site to the disposal site by grasping the cord 70 and pulling the carrier endwise so that it slides along its bottom panel 12. The polyester material from which the carrier is made enables the carrier to slide along its bottom surface smoothly over most types of terrain with relatively little effort. The corrugated structure of the material enables the carrier to be extremely light yet strong and rigid enough for carrying most types of loose, bulky material.

Figure 6:
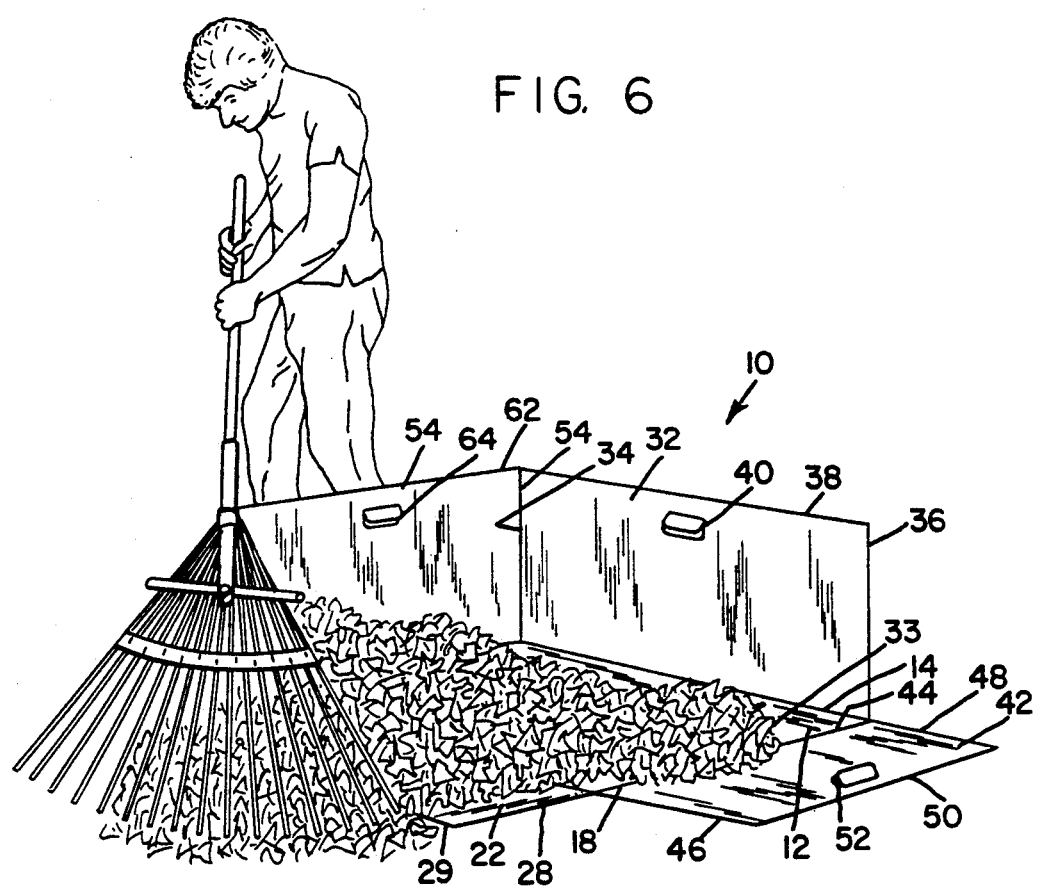
FIG. 6 is a perspective view of the carrier in a partially collapsed state for picking up loose particulate material.

The structure of the carrier 10 provides great versatility for collecting material. Loose particulate materials can be deposited into the carrier when it is completely open as shown in FIG. 4 or completely assembled as shown in FIG. 7 or in an intermediate state as shown in FIG. 6. For example, material such as leaves can be raked onto the carrier 10 when it is fully opened as shown in FIG. 4 and then formed into a box-like structure as shown in FIG. 7 for transporting leaves or other material to a deposition site. A preferred partially assembled form for collecting leaves is to arrange the carrier 10 so that one end wall and one side wall is in the upright position and the remaining and end side wall are in the open, horizontal position as shown in FIG. 6. The leaves can then be raked onto the horizontal panels with the upright panels serving as a retaining wall. After the leaves have been deposited onto the horizontal panels the end panel and the side panel which are in the horizontal position are then raised to the vertical position to form the box-like structure as shown in FIG. 7, wherein the leaves are totally contained within the structure. The full container can then be transported by pulling on the cord 70 which causes the container 10 to slide along the ground to a dumping site. During the winter, snow can be removed in the same manner as described for leaves, particularly for use in locations where there is no place to deposit the snow with a shovel. In such a case, the container 10 can be filled with snow and then dragged to a location where the snow can be dumped. When the container 10 is not being utilized it can be converted into its collapsed, folded state as shown in FIG. 5, carried quite easily by inserting the hand into one of the cut out areas 30 or 40 and storing the container in an appropriate location. The compact nature of the container 10 requires very little storage space.

Clearly, minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A slidable utility carrier comprising:
   (a) a rectangular bottom panel which has a pair of opposite side edges and a pair of opposite end edges,
   (b) a first rectangular side panel which has a pair of opposite end edges, a top edge and a bottom edge which is connected to one of the side edges of said bottom panel for pivoting movement from an upright vertical position to either a first horizontal position in which said side panel extends away from said bottom panel and is coplanar with said bottom panel or a second horizontal position in which said side panel overlies said bottom panel,
   (c) a second rectangular side panel which has a pair of opposite side edges, a top edge and a bottom edge which is connected to the other of the side edges of said bottom panel for pivoting movement from an upright vertical position to either a first horizontal position in which said second side panel extends away from said bottom panel or to a second horizontal position in which said side panel overlies said bottom panel,
   (d) a first rectangular end panel which has a pair of opposite side edges, a top edge and a bottom edge which is connected to one of the end edges of said bottom panel for pivoting movement from an upright vertical position to either a first horizontal position in which said first end panel extends away from said bottom panel or to a second horizontal position in which said first end panel overlies said bottom panel, (e) a second rectangular end panel which has a pair of opposite side edges, a top edge and a bottom edge which is connected to the other of the end edges of said bottom panel for pivoting movement from an upright vertical position to either a first horizontal position in which said second end panel extends away from said bottom panel or to a second horizontal position in which said second end panel overlies said bottom panel, (f) releasable fastening means carried by said end and side panels at predetermined positions along edges thereof for releasably connecting each said side edge of said end panels to corresponding said side edges of said side panels when said end panels and said side panels are in their upright positions to form a temporary rectangular enclosure, and (g) said panels being made of a single sheet of extruded thermoplastic material comprising:
  (1) a first planar layer,
  (2) a second planar layer which is parallel with and spaced from said first planar layer, and
  (3) a plurality of connecting webs which extend from said first planar layer to said second planar layer, said opposite side edges of said first and second rectangular side panels and said first and second rectangular end panels being free edges that are not connected to other said edges on other panels, whereby single thicknesses of said end panels directly contact single thicknesses of said side panels when in said second horizontal position, said extruded thermoplastic material providing a smooth sliding surface and rigidity and strength for said temporary rectangular enclosure, wherein said fastening means connects said side panels to each other when in said second horizontal position.

2. The carrier of claim 1 wherein each said side panel has a cutout handle.

3. A slidable utility carrier comprising:
(a) a rectangular bottom panel which has a pair of opposite side edges and a pair of opposite end edges,
(b) a first rectangular side panel which has a pair of opposite end edges, a top edge and a bottom edge which is connected to one of the side edges of said bottom panel for pivoting movement from an upright vertical position to either a first horizontal position in which said side panel extends away from said bottom panel and is coplanar with said bottom panel or a second horizontal position in which said side panel overlies said bottom panel,
(c) a second rectangular side panel which has a pair of opposite side edges, a top edge and a bottom edge which is connected to the other of the side edges of said bottom panel for pivoting movement from an upright vertical position to either a first horizontal position in which said second side panel extends away from said bottom panel or to a second horizontal position in which said side panel overlies said bottom panel,
(d) a first rectangular end panel which has a pair of opposite side edges, a top edge and a bottom edge which is connected to one of the end edges of said bottom panel for pivoting movement from an upright vertical position to either a first horizontal position in which said first end panel extends away from said bottom panel or to a second horizontal position in which said first end panel overlies said bottom panel,
(e) a second rectangular end panel which has a pair of opposite side edges, a top edge and a bottom edge which is connected to the other of the end edges of said bottom panel for pivoting movement from an upright vertical position to either a first horizontal position in which said second end panel extends away from said bottom panel or to a second horizontal position in which said second end panel overlies said bottom panel,
(f) releasable fastening means carried by said end and side panels at predetermined positions along edges thereof for releasably connecting each said side edge of said end panels to corresponding said side edges of said side panels when said end panels and said side panels are in their upright positions to form a temporary rectangular enclosure, and
(g) said panels being made of a single sheet of extruded thermoplastic material comprising:
  (1) a first planar layer,
  (2) a second planar layer which is parallel with and spaced from said first planar layer, and
  (3) a plurality of connecting webs which extend from said first planar layer to said second planar layer, said opposite side edges of said first and second rectangular side panels and said first and second rectangular end panels being free edges that are not connected to other said edges on other panels, whereby single thicknesses of said end panels directly contact single thicknesses of said side panels when in said second horizontal position, said extruded thermoplastic material providing a smooth sliding surface and rigidity and strength for said temporary rectangular enclosure wherein each of said end panels includes an aperture near the bottom edge, and further comprising a rope passing through said apertures and directly over said bottom panel for pulling said carrier.

4. The carrier of claim 3 wherein each said side panel has a cutout handle.

* * * * *